US012753306B2

(12) United States Patent
Noor et al.

(10) Patent No.: US 12,753,306 B2
(45) Date of Patent: Oct. 6, 2026

(54) STRETCH COMPOUND AND METHOD OF MAKING THE SAME

(71) Applicant: HASBRO, INC., Pawtucket, RI (US)

(72) Inventors: Shamshad F. Noor, Upton, MA (US); Andrew Collins, Rumford, RI (US)

(73) Assignee: HASBRO, INC., Pawtucket, RI (US)

( * ) Notice: Subject to any disclaimer, the term of this patent is extended or adjusted under 35 U.S.C. 154(b) by 706 days.

(21) Appl. No.: 18/032,984

(22) PCT Filed: Oct. 26, 2021

(86) PCT No.: PCT/US2021/056627
§ 371 (c)(1),
(2) Date: Apr. 20, 2023

(87) PCT Pub. No.: WO2022/093803
PCT Pub. Date: May 5, 2022

(65) Prior Publication Data

US 2023/0392006 A1 Dec. 7, 2023

Related U.S. Application Data

(60) Provisional application No. 63/106,250, filed on Oct. 27, 2020.

(51) Int. Cl.
*C08L 71/02* (2006.01)

(52) U.S. Cl.
CPC .................................... *C08L 71/02* (2013.01)

(58) Field of Classification Search
None
See application file for complete search history.

(56) References Cited

U.S. PATENT DOCUMENTS 5,446,064 A * 8/1995 Hori ........................ C08F 10/00 524/297
5,498,645 A * 3/1996 Mariano ................... B44C 3/04 524/427
5,801,116 A 9/1998 Cottrell et al.
5,990,205 A * 11/1999 Cordova ................. C08L 29/04 524/400
6,231,970 B1 5/2001 Andersen et al.
6,259,057 B1 7/2001 Lai
6,312,731 B1 11/2001 Staas et al.
6,348,534 B1 * 2/2002 Bianco ................... C08K 5/103 524/378
6,528,088 B1 3/2003 Gilleland et al.
6,605,298 B1 8/2003 Leigh et al.
6,713,624 B1 3/2004 Doane, Jr. et al.
6,849,588 B2 2/2005 Elsik et al.
7,053,125 B2 5/2006 Lewis et al.
7,225,920 B2 6/2007 Hoeffkes et al.
7,354,440 B2 4/2008 Truckal et al.
7,417,019 B2 8/2008 Weber et al.
7,534,422 B2 5/2009 Etayo Garralda et al.
8,105,997 B2 1/2012 Zhu et al.
8,496,970 B2 7/2013 Binette et al.
8,574,544 B1 11/2013 Sung et al.
8,641,775 B2 2/2014 Harmon et al.
8,691,259 B2 4/2014 Bowman et al.
8,779,094 B2 7/2014 Johnston et al.
8,846,022 B2 9/2014 Carnahan et al.
8,871,017 B2 10/2014 Doane, Jr. et al.
8,920,842 B2 12/2014 Chenite et al.
8,992,945 B2 3/2015 Lee et al.
9,006,216 B2 4/2015 Martin
9,034,571 B2 5/2015 Berry et al.
9,205,049 B2 12/2015 Reddy et al.
9,211,362 B2 12/2015 Hwang et al.
9,273,196 B2 3/2016 Doane, Jr. et al.
9,283,300 B2 3/2016 Han et al.
9,439,857 B2 9/2016 Tamarkin et al.
9,446,075 B2 9/2016 Maguire
9,458,556 B2 10/2016 Bailey et al.
9,505,916 B2 11/2016 Flury et al.
9,549,842 B2 1/2017 Kovarik
9,610,282 B2 4/2017 Veenstra et al.
9,647,255 B2 5/2017 Choi et al.
9,803,068 B2 10/2017 Doane, Jr. et al.
9,878,020 B2 1/2018 Mateescu et al.
9,951,209 B2 4/2018 Doane, Jr. et al.
9,963,597 B2 5/2018 Aizenberg et al.
10,030,065 B2 7/2018 Brix et al.
10,246,461 B2 4/2019 Mao et al.
10,270,128 B2 4/2019 Hatta et al.
10,364,369 B2 7/2019 Ayambem
10,369,204 B2 8/2019 Schøller et al.
10,537,526 B2 1/2020 Wright et al.
10,544,364 B2 1/2020 Krysiak et al.
10,555,804 B2 2/2020 De Juan, Jr et al.
10,583,220 B2 3/2020 Binette et al.
10,603,408 B2 3/2020 Binette et al.
10,646,574 B2 5/2020 Tarrand et al.

(Continued)

FOREIGN PATENT DOCUMENTS

| | | | |
|---|---|---|---|
| CA | 2 010 970 | A1 | 8/1990 |
| DE | 40 12 479 | A1 | 10/1991 |
| DE | 198 13 171 | C1 | 11/1999 |
| EP | 1060237 | A1 | 12/2000 |
| EP | 1169020 | A1 | 1/2002 |
| EP | 1210071 | A1 | 6/2002 |
| EP | 1893296 | A1 | 3/2008 |
| EP | 2621713 | A1 | 8/2013 |
| EP | 3485899 | A1 | 5/2019 |

(Continued)

OTHER PUBLICATIONS

Ashland Aqualon® cellulose gum Product Data Sheet, 2015, p. 1-3.*

(Continued)

*Primary Examiner* — Robert S Jones, Jr.
*Assistant Examiner* — Christiaan Roelofse
(74) *Attorney, Agent, or Firm* — MARSHALL, GERSTEIN & BORUN LLP

(57) ABSTRACT

A boron-free slime-like composition can include polyethylene oxide, cellulose, a filler, and water.

20 Claims, No Drawings

(56) References Cited

U.S. PATENT DOCUMENTS

| | | | |
|---|---|---|---|
| 10,665,841 | B2 | 5/2020 | Hatta et al. |
| 10,688,216 | B2 | 6/2020 | Stockman et al. |
| 2002/0035070 | A1 | 3/2002 | Gardlik et al. |
| 2002/0119174 | A1 | 8/2002 | Gardlik et al. |
| 2003/0018112 | A1* | 1/2003 | Okuhara ................. C08L 27/24 524/450 |
| 2003/0224000 | A1 | 12/2003 | Kokai-Kun et al. |
| 2005/0043271 | A1 | 2/2005 | Gross et al. |
| 2005/0074614 | A1 | 4/2005 | Jonas et al. |
| 2005/0113471 | A1 | 5/2005 | Sanchez et al. |
| 2005/0118256 | A1 | 6/2005 | Sen et al. |
| 2005/0208135 | A1 | 9/2005 | Viswanathan et al. |
| 2005/0226838 | A1 | 10/2005 | Krause et al. |
| 2006/0134195 | A1 | 6/2006 | Fu et al. |
| 2006/0205924 | A1 | 9/2006 | Muda |
| 2007/0036899 | A1 | 2/2007 | Patil et al. |
| 2007/0264528 | A1 | 11/2007 | Knight |
| 2008/0038206 | A1 | 2/2008 | Steinbrecht et al. |
| 2008/0069857 | A1 | 3/2008 | Yeo et al. |
| 2008/0292560 | A1 | 11/2008 | Tamarkin et al. |
| 2008/0308243 | A1 | 12/2008 | Anderson et al. |
| 2009/0047654 | A1 | 2/2009 | Rapp et al. |
| 2009/0314183 | A1 | 12/2009 | Tripathi |
| 2010/0251934 | A1 | 10/2010 | Smith |
| 2011/0136935 | A1 | 6/2011 | Khor et al. |
| 2013/0032060 | A1 | 2/2013 | Cheng |
| 2013/0315972 | A1 | 11/2013 | Krasnow et al. |
| 2015/0119788 | A1 | 4/2015 | Loupis et al. |
| 2016/0361252 | A1 | 12/2016 | Franke |
| 2017/0065523 | A1 | 3/2017 | Nguyen et al. |
| 2018/0282588 | A1* | 10/2018 | Arigo ........................ C08L 9/00 |
| 2018/0320218 | A1 | 11/2018 | Kuo et al. |
| 2019/0029955 | A1 | 1/2019 | Kim et al. |
| 2019/0092931 | A1 | 3/2019 | Glenn et al. |
| 2020/0009364 | A1 | 1/2020 | Amir |
| 2020/0078305 | A1 | 3/2020 | Auvinen et al. |
| 2020/0230051 | A1 | 7/2020 | Lichter et al. |

FOREIGN PATENT DOCUMENTS

| | | | |
|---|---|---|---|
| WO | WO-1989012107 | A1 | 12/1989 |
| WO | WO-1993013753 | A1 | 7/1993 |
| WO | WO-1995005670 | A1 | 2/1995 |
| WO | WO-2007113682 | A2 | 10/2007 |
| WO | WO-2009046444 | A2 | 4/2009 |
| WO | WO-2011099498 | A1 | 8/2011 |
| WO | WO-2013094689 | A1 | 6/2013 |
| WO | WO-2015097953 | A1 | 7/2015 |
| WO | WO-2016129668 | A1 | 8/2016 |
| WO | WO-2019082991 | A1 | 5/2019 |
| WO | WO-2019094700 | A1 | 5/2019 |

OTHER PUBLICATIONS

International Preliminary Report on Patentability for PCT Application No. PCT/US2021/056627, mailed May 2, 2023.

International Search Report and Written Opinion for Application No. PCT/US2021/056627, dated Mar. 10, 2022.

* cited by examiner

STRETCH COMPOUND AND METHOD OF MAKING THE SAME

BACKGROUND

Field of the Disclosure

The disclosure relates to stretch compounds and methods of making the same and more particularly to a boron-free slime-like compounds and methods of making the same.

BRIEF DESCRIPTION OF RELATED TECHNOLOGY

Slime or stretch compounds are popular toy products. Conventional slime products typically include a polymer, such as polyvinyl acetate, and a boron-based cross-linker to provide the slime-like sticky texture and stretch qualities.

Exposure to boron and salts thereof, however, has been identified as potentially harmful. Exposure to excessive levels of boron and salts thereof has been linked to skin irritation, diarrhea, vomiting and stomach cramps. In view of this, many countries are limiting the amount or even entirely preventing the presence of boron or boron containing compounds in consumer products, such as toy products.

SUMMARY

There is a need in the art for a boron-free slime compound that maintains or has improved the slime-like texture and/or stretch properties of conventional boron slimes.

In accordance with embodiments, a boron-free stretch compound can include polyethylene oxide, cellulose, a filler, and water. The compounds of the disclosure have good stretch properties and perform at least as well as conventional boron containing stretch or slime compounds.

DETAILED DESCRIPTION

A boron-free stretch compound can include polyethylene oxide, cellulose, and a filler. In embodiments, a boron-free stretch compound can include polyethylene oxide, a cellulose, and a silica filler. For example, the cellulose can be sodium carboxy methyl cellulose. Additional additive such as surfactants, lubricants, humectants, preservatives, and decorative fillers/additives can also be included in the compound. The compounds of the disclosure are water-based compounds. In embodiments, the compounds include more than 50% by weight based on the total weight of the compound of water. The compounds of the disclosure are boron free. As used herein, "boron-free" means that the compounds do not contain boron or any boron-containing compound such as a boron salt like borax.

It has advantageously been found that the combination of the polyethylene oxide and cellulose provides a composite hydrogel structure that give a slime-like stretch and texture without the need for a cross-linking agent. The incorporation of filler was found to improve the flow characteristics and strength of the resulting stretch compound.

Advantageously the compounds of the disclosure can have slime-like texture and stretch properties that is same as if not better than boron-containing compounds. The compounds of the disclosure can advantageously stretch to at least 10 times their original length without breaking. The compounds of the disclosure were found to have good hand feel and not be overly tacky or stick to the hands of the user during play. The compounds of the disclosure can have a light/fluffy texture while maintaining good tensile strength and without being sticky or tacky.

In embodiments, the polyethylene oxide can be included in an amount of about 1 wt % to about 10 wt %, based on the total weight of the compound. Other suitable amounts, based on the total weight of the compound include, about 2 wt % to about 8 wt %, about 5 wt % to about 10 wt %, about 3 wt % to about 9 wt %, and about 4 wt % to about 7 wt %, about 8 wt % to about 10 wt %. Other suitable amounts include, for example, about 1, 2, 3, 4, 5, 6, 7, 8, 9, and 10 wt % based on the total weight of the compound. In embodiments, the polyethylene oxide is provided in an amount less than 10 wt % based on the total weight of the compound.

Any known polyethylene oxide compounds can be used, such as commercially available Polyox WSR N-60K, WSR 301, and WSR 303 (DuPont).

The compounds of the disclosure can include a cellulose such as carboxymethyl cellulose (CMC), hydroxypropylmethyl cellulose (HPMC), and/or microcrystalline cellulose (MCC). In embodiments, the carboxy methyl cellulose can be a sodium carboxy methyl cellulose.

The cellulose can be included in an amount of about 1 wt % to about 10 wt %, based on the total weight of the compound. Other suitable amounts, based on the total weight of the compound include, about 2 wt % to about 8 wt %, about 5 wt % to about 10 wt %, about 3 wt % to about 9 wt %, and about 4 wt % to about 7 wt %. Other suitable amounts include, for example, about 1, 2, 3, 4, 5, 6, 7, 8, 9, and 10 wt % based on the total weight of the compound. In embodiments, the cellulose is provided in an amount less than 10 wt % based on the total weight of the compound. It has been found that adjusting the amount of cellulose can be used to adjust the hardness and overall texture of the compound. Increasing the cellulose increases the stiffness/hardness of the compositions.

In embodiment, the polyethylene oxide and the cellulose can be included at a ratio of polyethylene oxide to cellulose of about 1:1 to about 2:1, about 1.2:1 to about 1.8:1, or about 1.3:1 to about 1.5:1

In embodiments, the filler is one or more of silica, fumed silica, kaolin, cork, chalk, talcum, and microbeads and/or microspheres of glass or water-resistant plastic materials.

In embodiments, the filler is provided in an amount of about 0.5 wt % to about 5 wt %, about 0.5 wt % to about 1.5 wt %, about 1 wt % to about 4 wt %, or about 2 wt % to about 3 wt %, based on the total weight of the compound. Other suitable amounts include about 0.5, 0.6, 0.7, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, and 5 wt % based on the total weight of the compound. In embodiments, the compound includes less than 5 wt % filler based on the total weight of the compound. It has been observed that adjusting the filler content can be utilized to control the tensile strength of the resulting slime.

The compound is a water-based compound and generally includes at least 50 wt % by weight water. In embodiments, the compound includes about 50 wt % to about 80 wt %, about to about 70 wt %, about 65 wt % to about 80 wt % water based on the total weight of the compound. Others suitable water contents include about 50, 55, 60, 65, 70, 75, and 80 wt % based on the total weight of the compound.

The compound can further in various embodiments one or more preservatives. Compounds in accordance with the disclosure generally have a pH between 8 and 8.5. Any suitable preservative that is capable of remaining active at the pH of the compound can be used. For example, the preservative can include a preservative based on phenoxyethanol and ethylhexylglycerin, which is commercially available as Euxyl® PE 9010. Other suitable preservatives, include, but are not limited to, ginger root oil, amticide coconut, mixture of Phenoxyethanol and Benzoic Acid and Dehydroacetic Acid, sodium dehydroacetate, *Lactobacillus Acidophilus,* 3-isothiazolones, 1,2-benzisothiazolin-3-one, mixture of 2-bromo-2-nitropropane-1, 3-diol (8.80%), 5-chloro-2-methyl-4-isothiazolin-3-one (0.85%), and 2-methyl-4-isothiazolin-3-one, 3-Iodo-2-propynyl butyl carbamate.

The preservative can be provided in an amount of less than 1 wt % based on the total weight of the compound. For example, the preservative can be provided in an amount of about 0.3 wt % to less than about 1 wt %, and about 0.8 wt % to about 0.99 wt %. Other suitable amounts include, about 0.3, 0.4, 0.5, 0.6, 0.7, 0.8, 0.9, 0.95, 0.96, 0.97, 0.98, and 0.99 wt % based on the total weight of the compound.

The compound can further include in various embodiments one or more lubricants. Examples of lubricants include mineral spirits, mineral oil, and vegetable oil. The lubricant can be provided in an amount of about 1 wt % to about 10 wt %, based on the total weight of the compound. Other suitable amounts, based on the total weight of the compound include, about 2 wt % to about 8 wt %, about 5 wt % to about 10 wt %, about 3 wt % to about 9 wt %, and about 4 wt % to about 7 wt %. Other suitable amounts include, for example, about 1, 2, 3, 4, 5, 6, 7, 8, 9, and 10 wt % based on the total weight of the compound. In embodiments, the lubricant is provided in an amount less than 10 wt % based on the total weight of the compound.

The compound can further include a humectant. For example, the humectant can be a glycol. The glycol can be glycerin or a low molecular weight polyethylene glycol.

The humectant can be provided in an amount of about 1 wt % to about 10 wt %, based on the total weight of the compound. Other suitable amounts, based on the total weight of the compound include, about 2 wt % to about 8 wt %, about 5 wt % to about 10 wt %, about 3 wt % to about 9 wt %, and about 4 wt % to about 7 wt %. Other suitable amounts include, for example, about 1, 2, 3, 4, 5, 6, 7, 8, 9, and 10 wt % based on the total weight of the compound. In embodiments, the humectant is provided in an amount less than 10 wt % based on the total weight of the compound.

The stretch compound can further include one or more surfactants. For example, the surfactant can include one or more of polyglycols, coco betaine, polyethylene glycol esters of stearic acid, polyethylene glycol esters of lauric acid, ethoxylated alcohols, polyoxyethylenesorbitan monostearate, polyoxyethylenesorbitan monolaurate, poloxamers, cocamidopropyl hydroxysultaine, disodium cocoamphodipropionate, and polyethylene glycol monostearate. In embodiments, the surfactant is hydrophilic, and can have an HLB value of about 12 to about 15.

The surfactant can be present in an amount of about 1 wt % to about 10 wt %, based on the total weight of the compound. Other suitable amounts, based on the total weight of the compound include, about 2 wt % to about 8 wt %, about 5 wt % to about 10 wt %, about 3 wt % to about 9 wt %, and about 4 wt % to about 7 wt %. Other suitable amounts include, for example, about 1, 2, 3, 4, 5, 6, 7, 8, 9, and 10 wt % based on the total weight of the compound. In embodiments, the surfactant is provided in an amount less than 10 wt % based on the total weight of the compound.

The stretch compound can further include fragrance. The fragrance can be, for example, any water-dispersible, nontoxic fragrance.

In embodiments, the stretch compound can further include a colorant. In embodiments, the stretch compound can include colorant in an amount of 0 wt % to about 5 wt %, 0 wt % to about 3.5 wt % colorant, about 1 wt % to about 4 wt %, based on the total weight of the compound. The colorant can include, for example, any nontoxic dyes, pigments, phosphorescent pigments, or macro-sized particles such as glitter or pearlescent materials. For example, to obtain a blue fluorescent color, the compound can include about 0.2 to about 1 part by weight Day-Glo® Horizon Blue (Day-Glo Color Corp., Cleveland, Ohio) to about 100 parts of the compound. To obtain a red color (lake pigment), add about 0.1 to about 0.5 parts by weight FD&C Red No. 40 dye aluminum lake to about 100 parts of the compound.

The stretch compound can further include one or more decorative additives. Decorative additives can include but are not limited to glitter, latex fibers, colored cotton, shaped plastics, and the like. In embodiments, the colored cotton can be colored cotton bond paper or a colored fabric, such as a polyester knit or tricotton blend. The percentage of cotton in the colored cotton bond paper generally can be in a range between 100% and 80%. In embodiments, the decorative additive can be included in an amount of about 0.1 wt % to 5 wt %, about 0.5 wt % to 2 wt %, about 1 wt % to 3 wt %, and about 0.8 wt % to about 1.2 wt %, based on the total weight of the compound.

In embodiments, a stretch compound includes polyethylene oxide, cellulose, a humectant, a lubricant, a filler, a surfactant, a preservatives, and water.

In embodiments, a stretch compound includes about polyethylene oxide present, but in an amount less than about 10 wt %, a filler present, but in an amount less than about 5 wt %, cellulose present, but in an amount less than about 10 wt %, and water present in an amount greater than 50 wt %, all based on the total weight of the compound. In embodiments, the stretch compound further includes a preservative present in an amount less than 1 wt %, a humectant present in an amount less than 10 wt %, a lubricant present in an amount less than wt %, a surfactant present in an amount less than 10 wt %.

In embodiments, a stretch compound includes about polyethylene oxide present in an amount between about 7 wt % and about 10 wt %, a filler present in an amount between about wt % and 1.5 wt %, cellulose present in an amount between about 4 wt % and about 8 wt %, and water present in an amount between about 60 wt % and 70 wt %, all based on the total weight of the compound. In embodiments, the stretch compound further includes a preservative present in an amount between about 0.8 wt % and less than 1 wt %, a humectant present in an amount between about 7 wt % and about 9 wt %, a lubricant present in an amount between about 3 wt % and about 5 wt %, and a surfactant present in an amount between about 3 wt % and about 5 wt %.

Compounds of the disclosure can be made by first admixing the dry solid ingredients and then admixing with the wet/liquid ingredients until a smooth slime-like and/or stretchy compound is formed.

In use, the stretch compound is suitable for play on its own. Additionally, the stretch compound can be mixed with a starch-based modeling compound, which is dough-like, such as Play Doh®. Upon mixing with a starch based modeling compound, the stretch compound can impart enhanced stretch properties to the modeling compound.

In embodiments, a kit comprising the stretch compound of the disclosure and a starch based modeling compound is provided with instructions for mixing the two compositions. The starch based modeling compound can be any known modeling compound. For example, the modeling compound can be commercially available Play Doh®. For example, the starch-based modeling compound can be as described in any one of U.S. Pat. Nos. 6,080,231; 6,713,624; 8,871,017; and 9,803,068, the disclosures of which are incorporated herein by reference. In accordance with embodiments of the disclosure, the kits can allow users to develop desired consistencies of the resulting mixed compound by altering the amounts of a dough-like compound with a stretch compound in varying ratios. Such kits must result in a compatible and stable structure that maintains is structural integrity and resists degradation for continued use.

Example

A stretch composition in accordance with the disclosure, which was boron free, was formed using the following:

| Ingredients | Function | Wt % |
|---|---|---|
| Polyethylene oxide (Polyox WSR 301 NF) | PEO | 9.09 |
| Fumed silica (Cab-O-Sil M5__ | Filler | 1.00 |
| Sodium Carboxymethyl cellulose (Cekol 700) | cellulose | 6.80 |
| Water | solvent | 64.35 |
| Difunctional block copolymer surfactant terminating in primary hydroxyl groups (Pluronic L61) | Surfactant | 4.80 |
| Phenoxyethanol and ethylhexylglycerin based preservative (Euxyl PE 9010) | Preservative | 0.96 |
| Glycerine | Humectant | 8.60 |
| Mineral Oil | lubricant | 4.40 |
| Total | | 100.00 |

A 0.25 inch length of the compound (0.3043 g) was tested for stretch capacity. The sample was stretched by hand until breakage. The average after 10 stretches was a stretch length of 15.8 inches before breakage occurred.

The use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A stretch compound, comprising:

a polyethylene oxide;

a cellulose;

a filler; and water, wherein the stretch compound is free of boron or boron containing compounds and other cross-linking agents.

2. The stretch compound of claim 1, wherein the filler is one or more of silica, kaolin, chalk, cork, talcum, glass microbeads, glass microspheres, plastic microspheres, and plastic microbeads.

3. The stretch compound of claim 1, wherein the cellulose is selected from one or more of carboxy methyl cellulose, hydroxypropylcellulose, and microcrystalline cellulose.

4. The stretch compound of claim 3, wherein the cellulose is carboxy methyl cellulose and the carboxy methyl cellulose is sodium carboxy methyl cellulose.

5. The stretch compound of claim 1, comprising at least 50% by weight water based on the total weight of the compound.

6. The stretch compound of claim 1, comprising less than 10% by weight polyethylene oxide based on the total weight of the compound.

7. The stretch compound of claim 1, comprising less than 10% by weight cellulose based on the total weight of the compound.

8. The stretch compound of claim 1, further comprising a preservative.

9. The stretch compound of claim 8 wherein the preservative remains active at pH 8 to 8.5.

10. The stretch compound of claim 8, wherein the preservative is present in an amount of less than about 1 wt % based on the total weight of the compound.

11. The stretch compound of claim 1, further comprising one or more of a lubricant, a humectant, and a surfactant.

12. The stretch compound of claim 11, wherein the lubricant is one or more of mineral spirits, mineral oil, and vegetable oil.

13. The stretch compound of claim 11, wherein the lubricant is present in an amount of less than about 5 wt % based on the total weight of the compound.

14. The stretch compound of claim 11, wherein the humectant is one or more of glycerin and a low molecular weight polyethylene glycol.

15. The stretch compound of claim 11, wherein the humectant is present in an amount of less than about 10 wt % based on the total weight of the compound.

16. The stretch compound of claim 11, wherein the surfactant is one or more of polyglycol, coco betaine, polyethylene glycol esters of stearic acid, polyethylene glycol esters of lauric acid, ethoxylated alcohols, polyoxyethylenesorbitan monostearate, polyoxyethylenesorbitan monolaurate, and polyethylene glycol monostearate.

17. The stretch compound of claim 11, wherein the surfactant is present in an amount of less than about 10 wt % based on the total weight of the compound.

18. The stretch compound of claim 1, further comprising one or more of a decorative additive, a colorant, and a fragrance.

19. The stretch compound of claim 18, wherein the decorative additive is one or more of glitter, latex fiber, colored cotton, colored paper, and metal.

20. The stretch compound of claim 1, wherein the compound is capable of being stretched at least 10 times its original length.

* * * * *